United States Patent
Morse et al.

(10) Patent No.: US 8,445,148 B2
(45) Date of Patent: May 21, 2013

(54) METHOD OF FORMING A PACKAGE FOR MEMS-BASED FUEL CELL

(75) Inventors: Jeffrey D. Morse, Martinez, CA (US); Alan F. Jankowski, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 1459 days.

(21) Appl. No.: 10/952,260

(22) Filed: Sep. 27, 2004

(65) Prior Publication Data
US 2005/0064256 A1 Mar. 24, 2005

Related U.S. Application Data

(62) Division of application No. 09/967,145, filed on Sep. 28, 2001, now Pat. No. 6,821,666.

(51) Int. Cl.
*H01M 8/18* (2006.01)

(52) U.S. Cl.
USPC .......................... 429/423; 29/623.1

(58) Field of Classification Search
USPC ............. 429/34, 26, 35, 39, 38, 423, 442, 429/495, 505, 513; 29/623.1, 623.2, 623.4, 29/730
See application file for complete search history.

(56) References Cited

U.S. PATENT DOCUMENTS

| | | | | |
|---|---|---|---|---|
| 5,858,569 A | * | 1/1999 | Meacher et al. | 429/26 |
| 5,968,680 A | * | 10/1999 | Wolfe et al. | 429/13 |
| 6,051,331 A | * | 4/2000 | Spear et al. | 429/34 |
| 2003/0064275 A1 | * | 4/2003 | Morse et al. | 429/38 |
| 2008/0171249 A1 | * | 7/2008 | Arana et al. | 429/26 |

* cited by examiner

*Primary Examiner* — Mark F. Huff
*Assistant Examiner* — Monique Wills
(74) *Attorney, Agent, or Firm* — James S. Tak

(57) ABSTRACT

A MEMS-based fuel cell package and method thereof is disclosed. The fuel cell package comprises seven layers: (1) a sub-package fuel reservoir interface layer, (2) an anode manifold support layer, (3) a fuel/anode manifold and resistive heater layer, (4) a Thick Film Microporous Flow Host Structure layer containing a fuel cell, (5) an air manifold layer, (6) a cathode manifold support structure layer, and (7) a cap. Fuel cell packages with more than one fuel cell are formed by positioning stacks of these layers in series and/or parallel. The fuel cell package materials such as a molded plastic or a ceramic green tape material can be patterned, aligned and stacked to form three dimensional microfluidic channels that provide electrical feedthroughs from various layers which are bonded together and mechanically support a MEMS-based miniature fuel cell. The package incorporates resistive heating elements to control the temperature of the fuel cell stack. The package is fired to form a bond between the layers and one or more microporous flow host structures containing fuel cells are inserted within the Thick Film Microporous Flow Host Structure layer of the package.

17 Claims, 3 Drawing Sheets

METHOD OF FORMING A PACKAGE FOR MEMS-BASED FUEL CELL

CROSS-REFERENCE TO RELATED APPLICATION

This application is a divisional of application Ser. No. 09/967,145 filed on Sep. 28, 2001 now U.S. Pat. No. 6,821,666 entitled "Method of Forming a Package for MEMS-Based Fuel Cell"

The United States Government has rights in this invention pursuant to Contract No. W-7405-ENG-48 between the United States Department of Energy and the University of California for the operation of Lawrence Livermore National Laboratory.

BACKGROUND OF THE INVENTION

Portable power sources of various types have been under development for many years. A serious need exists for portable power sources with significantly higher power density, longer operating lifetime, and lower cost. Present rechargeable and primary portable power sources have excessive weight, size, and cost with limited mission duration. For example, batteries covering power range from 1-200 Watts have specific energies ranging from 50-250 Whr/Kg, which represents two to three hours of operation for a variety of applications.

SUMMARY OF THE INVENTION

Aspects of the invention include a method comprising the steps of: patterning a package material into a preform layout; forming a package from the package material into a plurality of layers comprising at least a fuel reservoir interface layer, a layer containing a plurality of resistive heating elements, a microporous flow host structure layer containing a fuel cell, and a cap layer; and incorporating microchannels into the package.

Further aspects of the invention include a fuel cell package comprising: a first layer having a current input, a fuel inlet and a first plurality of electrical leads connected to the current input; a second layer having an anode manifold support structure, a fuel flow passage connecting to the fuel inlet and a fuel outlet; a third layer having a manifold support beam, a resistive heater support structure, a fuel flow passage, an air flow inlet connecting to an air flow passage, and a resistive heater connecting to each of the first plurality of electrical leads; a fourth layer having a fuel flow passage, an air flow passage, and a microporous flow host structure containing a thin film fuel cell formed from an electrolyte sandwiched between an anode and a cathode; a fifth layer having an air manifold connecting to the air flow passage in the fourth layer, a fuel flow passage, an anode electrical feedthrough, and a cathode electrical feedthrough; a sixth layer having an air flow passage connected to the air manifold in the fifth layer, a fuel flow passage, an anode electrical feedthrough and a cathode electrical feedthrough; and a seventh layer having an air flow passage, a fuel flow passage, an anode electrical feedthrough and a cathode electrical feedthrough; wherein, a resistive electrical feedthrough and an electrical feedthrough connected to a ground communicates through each of the layers.

Further aspects of the invention include a fuel cell package comprising: a first layer having a current input, a fuel inlet and a first plurality of electrical leads connected to the current input; a second layer having an anode manifold support structure, a fuel flow passage connecting to the fuel inlet and a fuel outlet; a third layer having a manifold support beam, a resistive heater support structure, a fuel flow passage, and a resistive heater connecting to each of the first plurality of electrical leads; a fourth layer having a fuel flow passage and a microporous flow host structure containing a thin film fuel cell formed from an electrolyte sandwiched between an anode and a cathode; a fifth layer having an air containing means to allow air to breath into the fuel cell package, a fuel flow passage, an anode electrical feedthrough, and a cathode electrical feedthrough; a sixth layer, a fuel flow passage, an anode electrical feedthrough and a cathode electrical feedthrough; and a seventh layer having a fuel flow passage, an anode electrical feedthrough and a cathode electrical feedthrough; wherein, a resistive electrical feedthrough and an electrical feedthrough connected to a ground communicates through each of the layers.

DETAILED DESCRIPTION

The invention herein describes a method of forming a package for a miniature fuel cell device. Illustrated in FIGS. 1A-1G is a preform layer of a seven layer fuel cell package. The package can be fabricated from a Low Temperature Cofired Ceramic (LTCC), i.e., a ceramic green tape preform, such as Dupont 951 Green Tape, or a plastic or polymer preform, such as Dupont Kapton or Sylgard silicone. Methods to form the preform layers include laser cutting, injection molding, or extrusion molding of the ceramic or plastic.

Figure 1A:
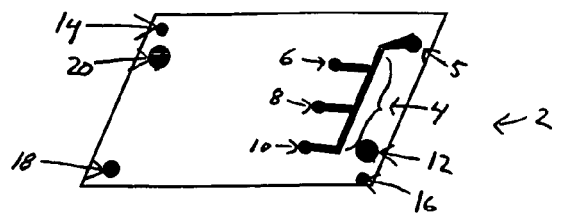
FIG. 1A shows the first layer of a ceramic green tape fuel cell prior to assembly.

Referring to FIG. 1A, the first layer of the package, a fuel reservoir interface 2, is fabricated from a ceramic green tape, molded ceramic, or a plastic preform. Fuel reservoir interface 2 comprises a resistive heater current input 4 having three electrical leads 6, 8, and 10, a fuel flow passage 12, a left side alignment pin 14, a right side alignment pin 16, and a grounded resistive heater feedthrough 18. Fuel reservoir interface 2 may also comprise an airflow via 20 if forced air is used. Resistive heater current input 4 can be connected to a load such as a battery or a super-capacitor, providing current flow to create heat in the resistor. Initial heating of the fuel cell package may also be introduced to the preform package through other techniques such as catalytically burning a hydrocarbon fuel-air mixture in a miniature isolated volume.

Figure 1B:
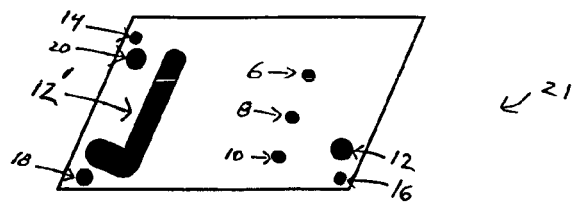
FIG. 1B shows the second layer of a ceramic green tape fuel cell prior to assembly.

A second layer of the fuel cell package shown in FIG. 1B is an anode manifold support and fuel/air flow through layer 21 that is fabricated from a ceramic green tape, molded ceramic, or a plastic preform. Anode manifold support and fuel/air flow through layer 21 comprises electrical feedthrough 5, electrical leads 6, 8, and 10, fuel flow passage 12, left side alignment pin 14, right side alignment pin 16, and grounded resistive heater feedthrough 18. Anode manifold support and fuel/air flow through layer 21 may further comprise airflow via 20 if forced air is used.

Figure 1C:
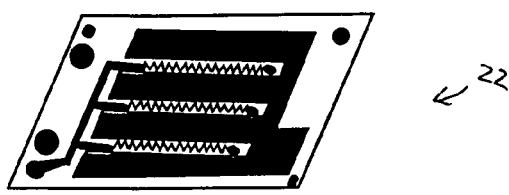
FIG. 1C shows the third layer of a ceramic green tape fuel cell prior to assembly.
Figure 2:
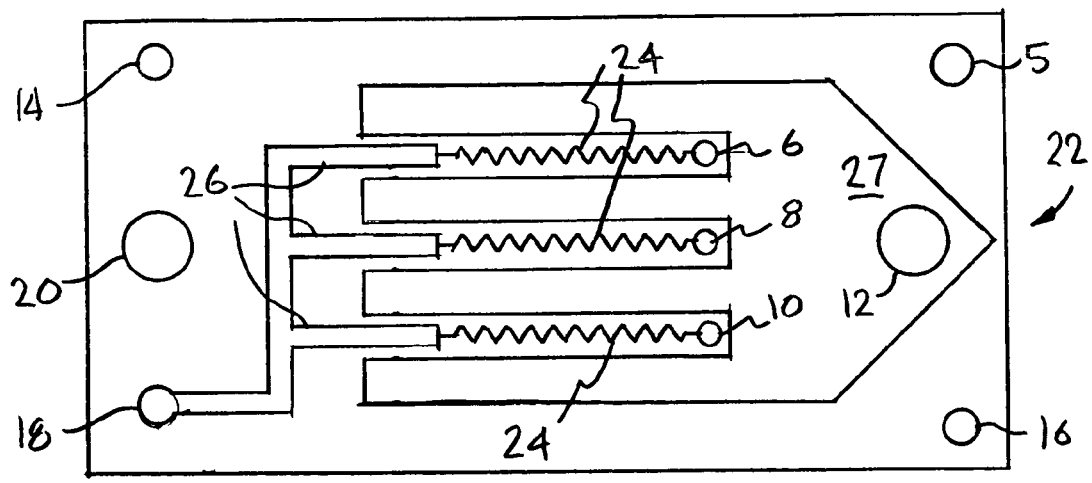
FIG. 2 is an illustration of the third layer, the fuel manifold and resistive heater layer, of a ceramic green tape fuel cell prior to assembly.

In FIG. 1C, a third layer of the fuel cell package is a fuel/anode manifold and resistive heater layer 22 that is fabricated from a ceramic green tape, molded ceramic, or a plastic preform. Fuel/anode manifold and resistive heater layer 22 rests directly on top of the second layer, anode manifold support and fuel/air flow through layer 21, allowing the electrical leads (6,8,10) to make continuous electrical contact to the first layer. Referring now to FIG. 2, fuel manifold support and resistive heater layer 22 is shown in greater detail. This layer comprises electrical feedthrough 5, left side alignment pin 14, right side alignment pin 16, fuel flow passage 12, a resistive heater 24, electrical leads 6, 8, 10 connected to electrical input 4 through electrical feedthrough 5, manifold support beam 27 on which resistive heater 24 is formed, and three electrical leads 26 that are connected to ground through electrical feedthrough 18. Fuel/anode manifold and resistive heater layer 22 provides the mechanical support for the next layer, which includes the thick film microporous support structure. Additionally, the manifold support and resistive heater layer may optionally contain an air flow via 20 if forced air is used. Resistive heaters are formed along the top surface of the manifold support beam 27. The heaters are connected to a common feedthrough electrical lead that is grounded at one end, and at the other end to feedthroughs connected to a common input electrical feedthrough. The input feedthrough can be connected to a small battery that can power the heater. Manifold support beam 27 and resistive heater layer 22 provide physical support beams which support microporous flow host structure.

Figure 1D:
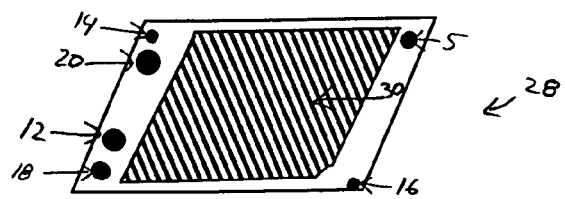
FIG. 1D shows the fourth layer of a ceramic green tape fuel cell prior to assembly.

Referring FIG. 1D, a Thick Film Microporous Flow Host Structure (TFMPFHS) layer 28 forms the fourth layer of the fuel cell package. TFMPFHS layer 28 comprises electrical feedthrough 5, a microporous flow host structure (not shown), a fuel flow passage 12, left side alignment pin 14, right side alignment pin 16, and grounded resistive heater feedthrough 18. TFMPFHS layer 28 may further comprise an airflow via 20 if forced air is used. TFMPFHS layer 28 forms a drop-in template 30 where a thick film microporous flow host structure (not shown) is positioned. Additional approaches can form the TFMPHS in a continuous ceramic laminate structure rather than forming a drop-in template. For this embodiment, the entirety of TFMPFHS layer 28 in FIG. 1 can be a thin film fuel cell formed on a ceramic or plastic laminate layer having a plurality of pores. The laminate can further include fuel and air feedthroughs as shown in FIG. 1, and the thin film fuel cell can be patterned in an appropriate template on the porous laminate layer so as to cover the center regions of pores, but not extend to the areas where the fuel and air flow channels are located.

Figure 3:
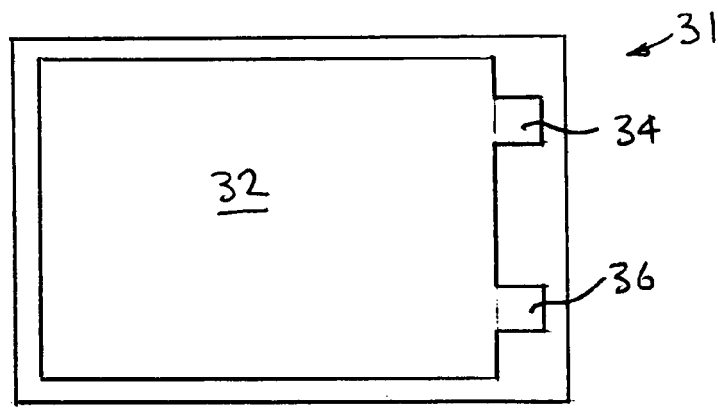
FIG. 3 is an illustration of a TFMPFHS (Thick Film Microporous Flow Host Structure) layer.

TFMPFHS layer 28 contains a thin film fuel cell at its top surface. Effective fuel cells are described elsewhere in pending U.S. Patent application S-88,911 which is hereby incorporated by reference. Referring to FIG. 3, a microporous flow host structure 31 comprises a thin film fuel cell 32, an anode contact 34, and a cathode contact 36. The fuel cell (not shown) includes a porous anode/catalyst layer, a dense electrolyte layer, and a porous cathode layer. The fuel cell can be either a proton exchange membrane (PEM) or solid oxide fuel cell (SOFC) materials structure. For the PEM fuel cell, the anode can be a thin film of nickel or carbon on the porous host structure, followed by a platinum or platinum-ruthenium catalyst. This is followed by the electrolyte material, which can be Nafion. The cathode can have a platinum catalyst, followed by another carbon or Ni porous electrode. PEM fuel cells typically operate at temperatures between about 60° C. and about 90° C. Similarly, an SOFC structure can be formed by depositing a Ni anode on the porous host structure, followed by an anode catalyst, such as cerium oxide ($CeO_2$), after which is located a dense electrolyte layer, such as yttria-stablized zirconia (YSZ). The dense electrolyte layer is followed by a cathode catalyst, such as cerium oxide ($CeO_2$), which is then followed by a porous electrode material, such as silver or lanthanum strontium manganate. In the invention, fuel is allowed to flow between the support beams, allowing fuel to come into contact with a majority of the anode surface area by way of the micropore passages in the thick film host structure.

Figure 1E:
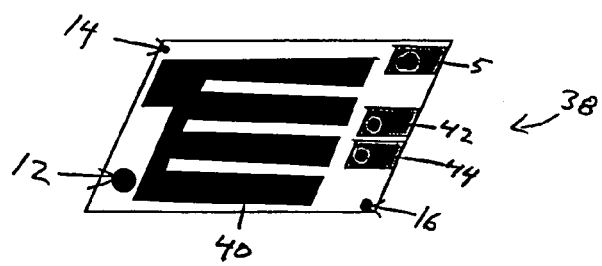
FIG. 1E shows the fifth layer of a ceramic green tape fuel cell prior to assembly.

FIG. 1E illustrates an air manifold layer 38 that forms the fifth layer of the fuel cell package. Air manifold layer 38 comprises electrical feedthrough 5, an air manifold 40, left side alignment pin 14, right side alignment pin 16, an anode electrical feedthrough 42, a cathode electrical feedthrough 44 fuel flow passage 12, and air flow via 20 if forced air is used.

Figure 1F:
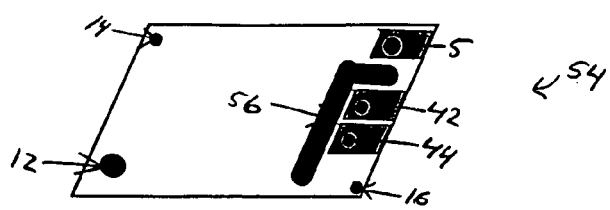
FIG. 1F shows the sixth layer of a ceramic green tape fuel cell prior to assembly.

FIG. 1F illustrates an air manifold support layer 54 that forms the sixth layer of the fuel cell package. Air manifold support layer 54 comprises electrical feedthrough 5, an air flow via 20 communicating with the air manifold 56, left side alignment pin 14, right side alignment pin 16, anode electrical feedthrough 42, cathode electrical feedthrough 44 and fuel flow passage 12.

Figure 1G:
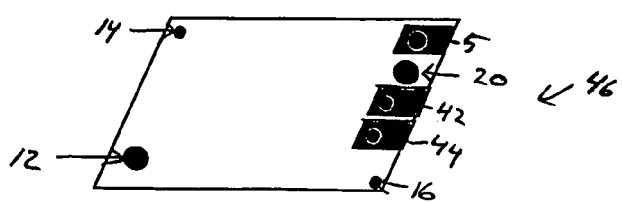
FIG. 1G shows the seventh layer of a ceramic green tape fuel cell prior to assembly.

FIG. 1G illustrates a ceramic green tape or Plastic preform cap 46 that forms the seventh layer of the fuel cell package. Cap 46 aligns directly over air manifold layer 38 forming sealed bonds around electrical feedthroughs 5, 42, 44, fuel flow passage 12 and air flow via 20. Cap 46 can serve as the final layer in the fuel cell package. If the fuel cell package contains several fuel cells, cap 46 acts as a common layer, i.e., serving the dual function of capping off a first sub-package while simultaneously serving as a microfluidic interface and support structure for a second sub-package (not shown). Cap 46 comprises electrical feedthrough 5, left side alignment pin 14, right side alignment pin 16, anode electrical feedthrough 42, cathode electrical feedthrough 44. If connected to a second sub-package (not shown), Cap 46 contains airflow via 20 and fuel flow passage 12.

Figure 4A:
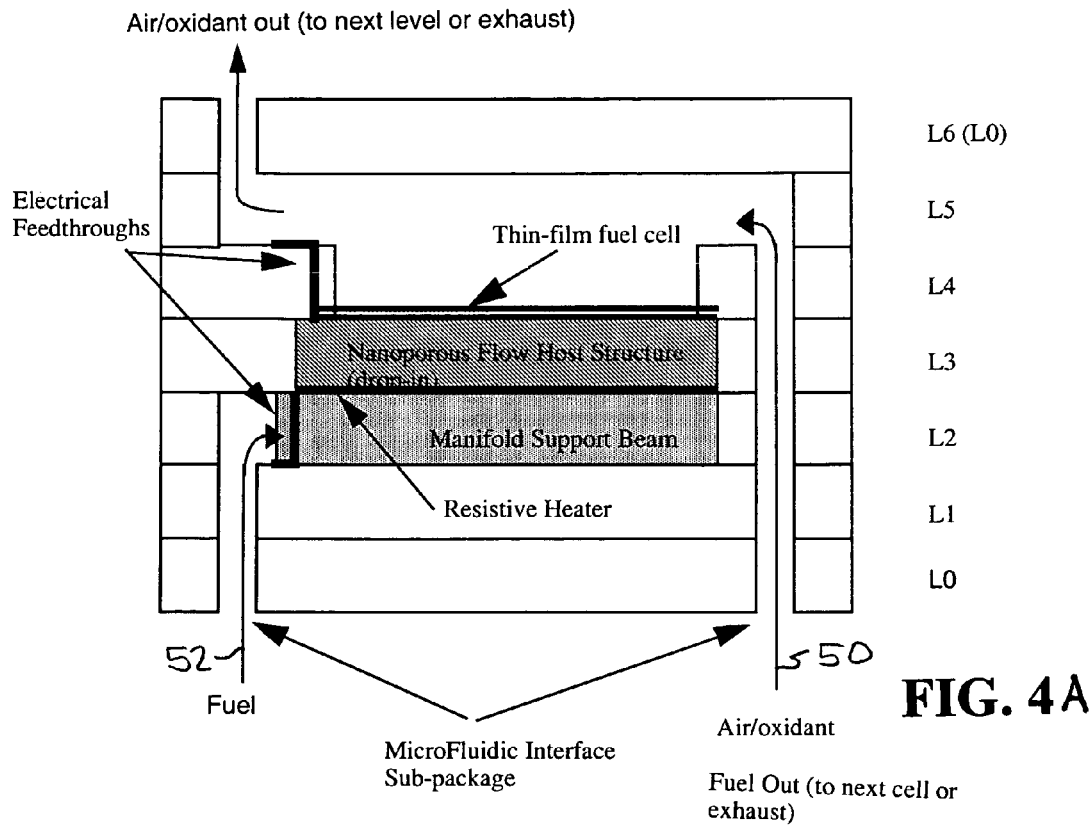
FIG. 4A is cross-sectional view of a microfluidic fuel cell package showing air flow path.
Figure 4B:
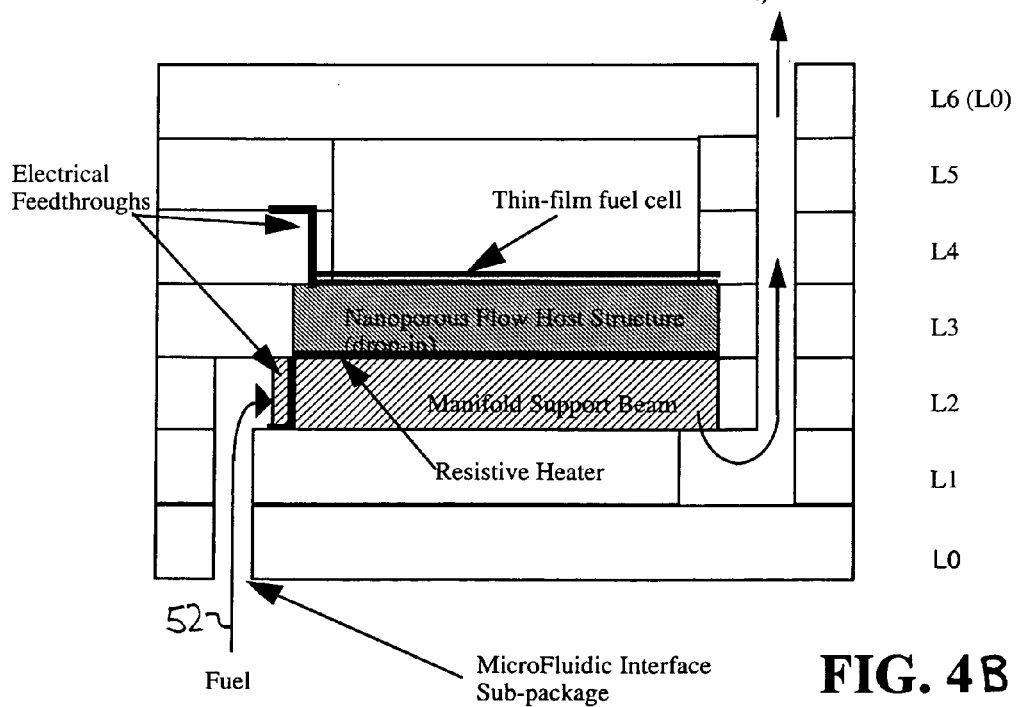
FIG. 4B is cross-sectional view of a microfluidic fuel cell package showing fuel flow path.

FIG. 4A shows a cross-sectional view of the first seven layers of a fuel cell package 48 showing the fuel flow path 52 in a cross flow configuration. FIG. 4B shows the first seven layers of a fuel cell package showing the air flow path 50 and the fuel flow path 52 in a cross flow configuration. Inlet flow passages for fuel, i.e. 52, and oxidant (air) sources, i.e. 50, are provided in the first layer which enable direct interface and design of heat transfer characteristics between the fuel cell package and a fuel storage reservoir (not shown) usually connected to the microfluidic fuel inlet using a valve, microvalve or other interconnect scheme.

Air flow 50 and air flow via 20 facilitate the use of forced air through the fuel cell package. Forced air is not necessary if an air "breathing" system is used. An air breathing system, for example, can contain perforations within the air manifold layer 38 that extends to the exterior of the package structure acting as a series of conduit that effectively provides air to the fuel cell.

The package material can comprise either a molded plastic or a ceramic green tape material. These materials are available in various thicknesses ranging from about 25 µm to about 1 mm (typically ranging from about 50 µm to about 250 µm) and can be shaped and patterned into arbitrary perform layouts using various etch or molding techniques. Etch techniques can, for example, include laser machining, wet etch or plasma etch. Extrusion molding and injection molding are examples of effective molding techniques. Metal interconnects can be patterned on these materials by any conventional means such as using screen print techniques.

A benefit of using ceramic green tapes for fuel cells is that the ceramic materials can be tailored to provide either high thermal conduction or high thermal isolation. This tailoring allows, for example, the center of the package to be concentrated at a high temperature while keeping the outer area cool, i.e., the operating temperature of the fuel cell can be between about 300° C. to about 650° C. while the fuel cell package remains cool enough to handle with a bare hand, i.e. less than about 55° C. Specific microfluidic cooling designs can be included in the laminated preform designs to provide counterflow heat exchange, thereby heating incoming cool gases with exhausted hot gas streams. Another benefit of using ceramic green tapes is that the ceramic preforms can have metal feedthroughs that enable electrical contact to conductive lead materials such as metal leads which can be made of, for example, silver or Platinum. The metal feedthroughs can extend vertically between the layers of the ceramic tape layers allowing several fuel cells to be stacked together in a three-dimensional layout. Another advantage for using ceramic green tapes is that resistive heating elements controlling the temperature of the electrode-electrolyte-electrode layers, i.e., the fuel cell stack, can be incorporated into the package. Additionally, microchannels that allow delivery of liquid fuel, and oxidant to specific sides of the fuel cell stack can also be incorporated into the package if ceramic green tape materials are used. In this embodiment, the inlet fuel passages can be coated with catalyst materials, such as Pt, Pt—Ru, Ni, or Cu—ZnO, which when heated assist in converting a liquid hydrocarbon fuel to hydrogen and other byproducts.

The microporous flow host structure can be silicon, ceramic, anodic alumina, plastic, or other similar material that contains a high density of porous flow channels formed therethrough, which allows direct flow of fuel to the porous anode structure of the fuel cell. The anode and cathode electrodes are patterned such that interconnect pads are positioned where they can make electrical contact to feedthroughs connected to the exterior of the package or the adjacent fuel cell positioned in the package.

Air manifold layer 38 provides the electrical feedthroughs for the anode, cathode, and resistor power input, as well as fuel and oxidant flow channels if necessary to connect to the adjacent level fuel cell in the stack. Air manifold layer 38 further provides a manifold to distribute the air to the cathode structure. In addition, air manifold layer 38 acts as a sealing means, such as, an o-ring seal around the top periphery of the microporous flow host structure that was inserted into TFMPFHS layer 28. A thin preform of Kapton tape or silicon dioxide tape can also be used to form a sealing bond beneath air manifold layer 38, or the forming properties of the plastic or ceramic green tape layers can be exploited to both bond and seal the microporous flow host structure/thin-film fuel cell into the package. Preferred methods and materials will depend on the desired operating temperature of the fuel cell package.

Ceramic green tape or plastic preform cap 46 is similar to the original sub-package microfluidic interface, except cap 46 contains electrical feedthroughs that enable simple fexibility when stacking and scaling the total number of fuel cells in the package.

The package is formed by aligning and contacting the package material layers. For instance, a green tape material contains a plastic binder materials which holds the thin sheets in form. The green tape structure is cofired in a furnace which removes the plastic binder and also forms a bond between the layers to thus, permanently connect the layers. Microporous flow host structure 30 is inserted within the layers as shown in FIG. 1. If any of the components of the microporous flow host structure cannot withstand the firing temperature of the ceramic tape, then the preform layers can be co-fired, i.e., all layers baked simultaneously, and assembled with the fuel cell using a low temperature adhesive to form the final bond and seal.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

The invention claimed is:

1. A fuel cell package comprising:
   a first layer having a current input, a fuel inlet and a first plurality of electrical leads connected to said current input;
   a second layer having an anode manifold support structure, a first fuel flow passage connecting to said fuel inlet, and a fuel outlet;
   a third layer having a fuel manifold support beam with one end in fluidic communication with the first fuel flow passage of the second layer and another end in fluidic communication with the fuel outlet, a resistive heater support structure, a fuel flow passage in fluidic communication with the fuel outlet, an air flow inlet connecting to an air flow passage, and a resistive heater connecting to each of said first plurality of electrical leads;
   a fourth layer having a fuel flow passage in fluidic communication with the fuel flow passage of the third layer, an air flow passage, and a microporous flow host structure containing a thin film fuel cell formed from an electrolyte sandwiched between an anode and a cathode;
   a fifth layer having an air manifold connecting to the air flow passage in the fourth layer, a fuel flow passage in fluidic communication with the fuel flow passage of the fourth layer, an anode electrical feedthrough, and a cathode electrical feedthrough;
   a sixth layer having an air flow passage connected to the air manifold in the fifth layer, a fuel flow passage in fluidic communication with the fuel flow passage of the fifth layer, an anode electrical feedthrough and a cathode electrical feedthrough; and
   a seventh layer having an air flow passage, a fuel flow passage in fluidic communication with the fuel flow passage of the of the sixth layer, an anode electrical feedthrough and a cathode electrical feedthrough;
   wherein, a resistive electrical feedthrough and an electrical feedthrough connected to a ground communicates through each of said layers.

2. A fuel cell package comprising:
   a solid oxide fuel cell; and a first patterned layer, adjacent to the solid oxide fuel cell, having at least one resistive heating element formed thereon, a first electrical feedthrough connected to the resistive heating element, and at least a portion of a first microchannel; and a second patterned layer bonded to the first patterned layer and having a second electrical feedthrough connected to the first electrical feedthrough, so that current supplied from the second electrical feedthrough is passed through the first electrical feedthrough to the resistive heating element, and at least a portion of a second microchannel which is in fluidic communication with the first microchannel and the first and second microchannels are arranged to allow delivery of at least one of a fuel and an oxidant to the fuel cell.

3. The fuel cell package of claim 2, comprising:
a thermal isolation structure tailored to maintain an outer area of the fuel cell package at a low temperature while an inner area of the fuel cell package is at a high temperature during operation.

4. The fuel cell package of claim 3, wherein the isolation structure is tailored to maintain the outer area of the fuel cell package at a temperature less than about 55° C. and the inner area at a temperature greater than about 300° C. during operation.

5. The fuel cell package of claim 2, comprising:
a high thermal conduction structure tailored to provide high thermal conduction.

6. The fuel cell package of claim 2, wherein at least one of the first patterned layer and the second patterned layer has a thickness ranging from about 25 micrometers to about 1 millimeter.

7. The fuel cell package of claim 2, wherein at least one of the first patterned layer and the second patterned layer comprises a material selected from the group consisting of silicon, ceramic green tape, ceramic, anodic alumina, and plastic.

8. The fuel cell package of claim 2, further comprising:
a second solid oxide fuel cell; and
a conductive lead,
wherein the conductive lead connects the second solid oxide fuel cell to the solid oxide fuel cell.

9. The fuel cell package of claim 2, further comprising:
a heat exchanger tailored to heat incoming cool gases by exhausted hot gas streams.

10. The fuel cell package of claim 2, further comprising:
a catalyst material disposed in at least a portion of at least one of the first microchannel and the second microchannel and tailored to assist in converting incoming fuel to a byproduct.

11. The fuel cell package of claim 10, wherein the byproduct comprises hydrogen.

12. The fuel cell package of claim 2, further comprising:
an electrical feedthrough connected to the solid oxide fuel cell and to an exterior of the fuel cell package.

13. The fuel cell package of claim 12, further comprising:
a sealed bond disposed around the electrical feedthrough.

14. A fuel cell package comprising:
a solid oxide fuel cell;
a first patterned layer, adjacent to the solid oxide fuel cell, having at least a portion of a first microchannel; and
a second patterned layer, bonded to the first patterned layer, having at least a portion of a second microchannel which is in fluidic communication with the first microchannel, the first and the second microchannels arranged to allow delivery of at least one of a fuel and an oxidant to the fuel cell, wherein at least one of the patterned layers comprises a ceramic tailored to thermally isolate the solid oxide fuel cell at a higher operating temperature than an outer portion of the fuel cell package.

15. The fuel cell package of claim 14, wherein the isolation structure is tailored to maintain the outer area of the fuel cell package at a temperature less than about 55° C. and the inner area at a temperature greater than about 300° C. during operation.

16. The fuel cell package of claim 14, wherein at least one of the first patterned layer and the second patterned layer includes a thermal conduction structure tailored to provide high thermal conduction in the inner area of the fuel cell package.

17. A fuel cell package comprising:
a first layer having a current input, a fuel inlet and a first plurality of electrical leads connected to said current input;
a second layer having an anode manifold support structure, a first fuel flow passage connecting to said fuel inlet, and a fuel outlet;
a third layer having a fuel manifold support beam with one end in fluidic communication with the first fuel flow passage of the second layer and another end in fluidic communication with the fuel outlet, a resistive heater support structure, a fuel flow passage in fluidic communication with the fuel outlet, an air flow inlet connecting to an air flow passage, and a resistive heater connecting to each of said first plurality of electrical leads;
a fourth layer having a fuel flow passage in fluidic communication with the fuel flow passage of the third layer, an air flow passage, and a microporous flow host structure containing a thin film fuel cell formed from an electrolyte sandwiched between an anode and a cathode;
a fifth layer having an air containing means to allow air to breath into the fuel cell package, a fuel flow passage in fluidic communication with the fuel flow passage of the fourth layer, an anode electrical feedthrough, and a cathode electrical feedthrough;
a sixth layer having an air flow passage connected to the air manifold in the fifth layer, a fuel flow passage in fluidic communication with the fuel flow passage of the fifth layer, an anode electrical feedthrough and a cathode electrical feedthrough; and
a seventh layer having an air flow passage, a fuel flow passage in fluidic communication with the fuel flow passage of the of the sixth layer, an anode electrical feedthrough and a cathode electrical feedthrough; wherein, a resistive electrical feedthrough and an electrical feedthrough connected to a ground communicates through each of said layers.

* * * * *